United States Patent Office 2,959,616
Patented Nov. 8, 1960

2,959,616
GUANIDINES

Stanley Birtwell, Manchester, England, assignor to Imperial Chemical Industries Limited, London, England, a corporation of Great Britain No Drawing. Filed Sept. 13, 1956, Ser. No. 609,526

Claims priority, application Great Britain Sept. 28, 1955

1 Claim. (Cl. 260—565)

This invention relates to new organic compounds and more particularly it relates to new guanidine compounds which possess useful therapeutic properties.

According to the invention we provide the said new guanidine compounds of the formula:

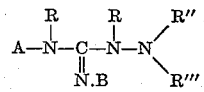

wherein, of the substituents A and B, one stands for a phenyl, a naphthyl or a tetrahydronaphthyl radical which may optionally bear substituents and the other stands for hydrogen or for an alkyl radical, wherein R, R' and R'' stand for hydrogen or for alkyl radicals and wherein R''' stands for hydrogen, an alkyl radical or an aralkyl radical, provided that when B, R, R', R'' and R''' stand for hydrogen then A does not stand for a phenyl radical, a p-methoxyphenyl radical or an o-methylphenyl radical and provided that when R, R' R'' and R''' stand for hydrogen and B stands for a methyl radical then A does not stand for a phenyl radical.

According to a further feature of the invention we provide a process for the manufacture of the said new guanidine compounds which comprises interaction of a compound of the formula:

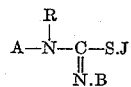

wherein A, B and R have the meaning stated above, J stands for a lower alkyl radical or benzyl radical, and a compound of the formula:

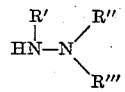

wherein R', R'' and R''' have the meaning stated above.

The compound of the formula:

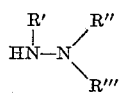

wherein R', R'' and R''' have the meaning stated above, may conveniently be used in the form of its hydrate or in the form of a salt for example in the form of the monohydrochloride. The reaction may also be conveniently carried out in the presence of an inert diluent or solvent for example methanol or ethanol.

The compound of the formula:

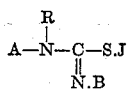

wherein A, B, R and J have the meaning stated above may conveniently be used in the form of a salt thereof for example in the form of the hydriodide or the hydrochloride.

The compounds of the formula:

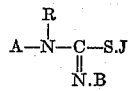

wherein A, B, R and J have the meaning stated above, which are to be used as starting materials may be obtained by interaction of the corresponding thiourea and an alkyl halide or an aralkyl halide according to the process known to the art. The said corresponding thioureas themselves may be obtained by interaction of the corresponding amine and benzoyl isothiocyanate followed by hydroylsis according to the process known to the art.

According to a further feature of the invention we provide a process for the manufacture of those of the new guanidine compounds of the formula stated above wherein B stands for hydrogen which comprises interaction of a compound of the formula:

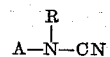

wherein A and R have the meaning stated above, and a compound of the formula:

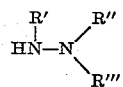

wherein R', R'' and R''' have the meaning stated above.

The reaction may conveniently be carried out in the presence of an inert diluent or solvent for example methanol and the compound of the formula:

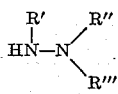

wherein R', R'' and R''' have the meaning stated above, may be used in the form of a salt thereof for example the hydrochloride.

According to a further feature of the invention we provide a process for the manufacture of those of the new guanidine compounds of the above stated formula wherein R stands for hydrogen which comprises interaction of a compound of the formula:

wherein A and B have the meaning stated above, and a compound of the formula:

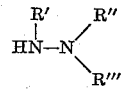

wherein R', R'' and R''' have the meaning stated above.

According to a further feature of the invention we provide a process for the manufacture of those of the new guanidine compounds of the above stated formula wherein R stands for hydrogen and B stands for an alkyl radical which comprises interaction of a compound of the formula:

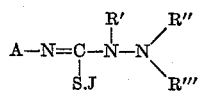

wherein A, R, R', R'' , R''' and J have the meaning stated above, and ammonia or an alkylamine of the formula:

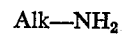

wherein Alk stands for an alkyl radical.

According to a further feature of the invention we provide a process for the manufacture of those of the new guanidine compounds of the above stated formula wherein R″ and R‴ stand for hydrogen which comprises catalytic hydrogenation of a compound of the formula:

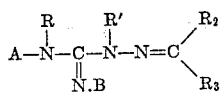

wherein A, B, R and R′ have the meaning stated above and $R_2$ stands for an alkyl or an aryl radical and $R_3$ stands for hydrogen, an alkyl radical or an aryl radical.

The reaction may conveniently be carried out in the presence of an inert diluent or solvent medium for example methanol. As a suitable catalyst there may be mentioned for example platinum.

As stated above, the new guanidine compounds of the invention possess useful therapeutic properties. The said compounds are useful for example in the treatment of allergic conditions for example allergic inflammatory diseases.

The invention is illustrated but not limited by the following examples in which the parts are by weight:

*Example 1*

A solution of hydrazine monohydrochloride (prepared from 41 parts of a 60% (w./v.) solution of hydrazine hydrate in water and 50.5 parts of hydrazine dihydrochloride) is mixed with 1,600 parts of methanol and to the mixture are added 193 parts of N-p-chlorophenyl-S-methylisothiourea. The mixture is heated under reflux for 22 hours and is then evaporated to dryness. The residue is crystallized from butanol to give $N^1$-amino-$N^2$-p-chlorophenylguanidine monohydrochloride, M.P. 184–186° C.

A solution of hydrogen chloride in butanol is added to the butanol crystallization filtrate and the mixture is filtered. The solid residue is crystallized from butanol, in the presence of an excess of hydrogen chloride, to give $N^1$-amino-$N^2$-p-chlorophenylguanidine dihydrochloride, M.P. 164–170° C.

*Example 2*

A solution of hydrazine monohydrochloride (prepared from 0.85 part of a 60% w./v. soltuion of hydrazine hydrate in water and 1.05 parts of hydrazine dihydrochloride) is mixed with 40 parts of methanol and to the mixture are added 3.9 parts of N-o-methoxy-phenyl-S-methylisothiourea (M.P. 88–90° C.). The mixture is heated under reflux for 22 hours and is then evaporated to dryness in vacuo. The residue is crystallized from ethanol to give $N^1$-amino-$N^2$-o-methoxyphenylguanidine hydrochloride, M.P. 168–172° C.

The N-o-methoxyphenyl-S-methylisothiourea used as starting material and also the related isothioureas used as starting material in the following examples may be obtained according to the following process. A 10% w./v. solution or suspension of the corresponding thiourea in methanol is treated with 1 to 1.5 molecular proportions of an alkyl halide or an aralkyl halide and the mixture is heated under reflux for 3 hours or until a homogeneous solution is obtained, whichever is the longer period. The solution is then evaporated to dryness to give the isothiourea hydrohalide which may be used as such or after a crystallization procedure. Alternatively, the free base may be obtained by treatment of the hydrohalide with excess of aqueous sodium hydroxide solution following by isolation and crystallization.

*Example 3*

A mixture of 3.8 parts of N:S-dimethyl-N-phenylisothiourea hydriodide (M.P. 183–186° C.) and 0.9 part of a 60% w./v. solution of hydrazine hydrate in water is heated under reflux with 40 parts of methanol for 26 hours. The solvent is evaporated under reduced pressure and the residue is stirred with butanol. The mixture is filtered and the solid residue is crystallized from butanol to give $N^1$-amino-$N^2$-methyl-$N^2$-phenylguanidine hydriodide, M.P. 135–137° C.

*Example 4*

25 parts of N-m-chlorophenyl-S-methylisothiourea (a gum) are added to a solution of hydrazine monohydrochloride (prepared from 4.9 parts of a 50% w./v. solution of hydrazine hydrate in water and 6.1 parts of hydrazine dihydrochloride) and the mixture is heated under reflux with 160 parts of methanol for 24 hours. It is then evaporated to dryness and the residue is dissolved in butanol and dry hydrogen chloride is passed through it with ice-cooling. There is thus obtained $N^1$-amino-$N^2$-m-chlorophenylguanidine dihydrochloride, M.P. 176–182° C. with decomposition.

*Example 5*

A mixture of 36 parts of N-2:4-dichlorophenyl-S-methylisothiourea hydriodide (M.P. 174–176° C.), 10 parts of a 50% w./v. solution of hydrazine hydrate in water and 50 parts of methanol is heated under reflux for 24 hours. The reaction mixture is cooled and filtered. The filtrate is basified by the addition of excess aqueous ammonia (density=0.88), diluted with water and extracted with ether. The ethereal extract is dried over magnesium sulphate and evaporated. The residue is dissolved in butanol and the solution is saturated with dry hydrogen chloride to give $N^1$-amino-$N^2$-2:4-dichlorophenylguanidine dihydrochloride, M.P. 230–235° C. with decomposition.

*Example 6*

A mixture of 160 parts of methanol, 61 parts of N-p-bromophenyl - S - methylisothiourea hydriodide (M.P. 190–192° C.) and 16.4 parts of a 50% w./v. solution of hydrazine hydrate in water is heated under reflux for 25 hours. The solution is evaporated to dryness and the residue is crystallized from butanol to give $N^1$-amino-$N^2$-p-bromophenylguanidine hydriodide, M.P. 156–160° C. with decomposition.

*Example 7*

A mixture of 58 parts of N-α-naphthyl-S-methylisothiourea hydriodide (M.P. 187–190° C.), 16.9 parts of a 50% w./v. solution of hydrazine hydrate in water and 200 parts of methanol is heated under reflux for 24 hours. The solution is filtered, the filtrate is evaporated to dryness and the residue is crystallized twice from buantol to give $N^1$-amino-$N^2$-α-naphthylguanidine hydriodide, M.P. 162–164° C.

When the N-α-naphthyl-S-methylisothiourea hydriodide used as starting material is replaced by N-β-naphthyl-S-methylisothiourea hydriodide, there is likewise obtained, after two crystallizations from butanol, $N^1$-amino-$N^2$-β-naphthylguanidine hydriodide, M.P. 156–158° C.

*Example 8*

A mixture of 8.5 parts of N-p-nitrophenyl-S-methylisothiourea hydriodide (M.P. 180–182° C.), 2.1 parts of a 60% w./v. solution of hydrazine hydrate in water and 80 parts of methanol is heated under reflux for 22 hours. The methanol is removed in vacuo and the residue is crystallized from buantol. The crystalline solid so obtained is treated with a solution of hydrogen chloride in methanol and the mixture is then filtered. The solid residue is dissolved in methanol, filtered from insoluble material and the filtrate is diluted with ether to give $N^1$-amino-$N^2$-p-nitrophenylguanidine dihydrochloride, M.P. 208–209° C. with decomposition.

*Example 9*

A solution of hydrazine monohydrochloride (prepared from 0.95 part of hydrazine hydrochloride and 0.76 part of a 50% w./v. solution of hydrazine hydrate in water) is mixed with 40 parts of methanol. 3.7 parts of N-2:4-dimethylphenyl-S-ethylisothiourea (a gum) are then added and the mixture is refluxed for 22 hours. The solvent is evaporated under reduced pressure and the residue is treated with butanol. The solution is filtered and the filtrate is treated with dry hydrogen chloride to give $N^1$-amino - $N^2$-2:4-dimethylphenylguanidine dihydrochloride which after washing with buantol and ether has M.P. 150–156° C. with decomposition.

*Example 10*

A mixture of 13 parts of N-2:3-dimethylphenyl-S-benzylisothiourea hydrochloride (a gum), 2.1 parts of hydrazine hydrate and 80 parts of methanol is heated under reflux for 24 hours. The solution is evaporated to dryness in vacuo and the residue is dissolved in butanol. The solution is treated with a butanol solution of hydrogen chloride and the mixture is then diluted with ether. The mixture is filtered and the solid residue is dissolved in butanol and treated with a butanol solution of hydrogen chloride followed by ether. There is thus obtained $N^1$-amino - $N^2$-2:3-dimethylphenylguanidine dihydrochloride, M.P. 148–150° C. with decomposition.

*Example 11*

A mixture of 12 parts of N-2-methoxy-5-methylphenyl-S-methylisothiourea hydriodide (M.P. 154–156° C. from 2-methoxy-5-methylphenylthiourea, M.P. 110–112° C.), 1.77 parts of hydrazine hydrate and 100 parts of methanol is heated under reflux for 24 hours. The solvent is evaporated and the residue is crystallized from butanol to give $N^1$-amino-$N^2$-2-methoxy - 5 - methylphenylguanidine hydriodide, M.P. 159–160° C. with decomposition.

*Example 12*

A mixture of 0.95 part of hydrazine hydrate and 8 parts of N-p-iodophenyl-S-methylisothiourea hydriodide (M.P. 217–218° C.) is heated under reflux in 64 parts of methanol for 24 hours. The solution is then evaporated to dryness and the residue is crystallized from alcohol to give $N^1$-amino - $N^2$ - p-iodophenylaminoguanidine hydriodide, M.P. 207° C. with decomposition.

*Example 13*

A solution of 1.18 parts of hydrazine hydrate and 7.25 parts of N-p-tolyl-S-methylisothiourea hydriodide (M.P. 112–114° C.) in 60 parts of methanol is heated under reflux for 24 hours. The solvent is evaporated in vacuo and the residue is stirred first with dry ether and then with small amounts of dry dioxan and filtered. The solid residue is crystallized from dioxan to give $N^1$-amino-$N^2$-p-tolylguanidine hydriodide, containing dioxan of crystallization, of M.P. 89–90° C.

*Example 14*

A mixture of 10.4 parts of N-5:6:7:8-tetrahydro-α-naphthyl-S-methylisothiourea hydriodide (M.P. 176–178° C. from 5:6:7:8-tetrahydro - α - naphthylthiourea M.P. 166–168° C.) and 1.5 parts of hydrazine hydrate in 80 parts of methanol is heated under reflux for 24 hours. The solvent is then evaporated under reduced pressure and the residue is crystallized twice from ethanol by the addition of ether. There is thus obtained $N^1$-amino-$N^2$-5:6:7:8-tetrahydro-α-naphthylguanidine hydriodide, M.P. 150–152° C.

*Example 15*

The process as described in Example 14 is repeated using as starting materials 16.1 parts of N-2:5-dimethylphenyl-S-methylisothiourea hydriodide, 2.5 parts of hydrazine hydrate and 128 parts of methanol. By working in a similar manner there is likewise obtained $N^1$-amino-$N^2$-2:5-dimethylphenylguanidine hydriodide M.P. 131–133° C.

*Example 16*

A mixture of 17.5 parts of N-p-n-butylphenyl-S-methylisothiourea hydriodide (a gum from p-n-butylphenylthiourea, M.P. 145–147° C.) and 2.5 parts of hydrazine hydrate is heated under reflux in 140 parts of methanol for 24 hours. The solvent is evaporated under diminished pressure and the residue is dissolved in water. The solution is basified with a slight excess of aqueous sodium hydroxide solution and the mixture is extracted with ether. The ethereal extract is washed with water, dried over magnesium sulphate and then poured in to a small volume of methanol saturated with hydrogen chloride. There is thus obtained $N^1$-amino-$N^2$-p-n-butylphenylguanidine dihydrochloride, M.P. 142–154° C. with decomposition.

*Example 17*

A mixture of 2.5 parts of hydrazine hydrate, 17.1 parts of N-3-chloro-4-methylphenyl-S-methylisothiourea hydriodide (M.P. 136–138° C. from 3-chloro-4-methylphenylthiourea, M.P. 174–176° C.) and 140 parts of methanol is heated under reflux for 24 hours. The solvent is removed in vacuo and the residue is crystallized from a mixture of butanol and petroleum ether (B.P. 40–60° C.) and there is thus obtained $N^1$-amino-$N^2$-3-chloro-4-methylphenylguanidine hydriodide, M.P. 114–116° C.

*Example 18*

A mixture of 1 part of hydrazine hydrate and 6.95 parts of N-5:6:7:8-tetrahydro-β-naphthyl-S-methylisothiourea hydriodide (M.P. 134–136° C. from 5:6:7:8-tetrahydro-β-naphthylthiourea, M.P. 174–175° C.) in 56 parts of methanol is heated under reflux for 24 hours. The solvent is evaporated under reduced pressure and the residue is crystallized from a mixture of ethanol and ether. There is thus obtained $N^1$-amino-$N^2$-5:6:7:8-tetrahydro-β-naphthylguanidine hydriodide, M.P. 154–156° C.

*Example 19*

The process as described in Example 18 is repeated using as starting materials 3.9 parts of N-(2-methyl-4-chlorophenyl)-S-methylisothiourea hydriodide (M.P. 138–140° C.), 0.57 part of hydrazine hydrate and 32 parts of methanol. By working in a similar manner, there is likewise obtained $N^1$-amino-$N^2$-(2-methyl-4-chlorophenyl)guanidine hydriodide, M.P. 180° C. with decomposition.

*Example 20*

The process as described in Example 18 is repeated using as starting material 3.1 parts of N-(3-methyl-4-chlorophenyl)-S-methylisothiourea hydriodide (M.P. 172–174° C. from 3-methyl-4-chlorophenylthiourea, M.P. 166–168° C.), 0.45 part of hydrazine hydrate and 24 parts of methanol. By working in a similar manner, there is likewise obtained $N^1$-amino-$N^2$-(3-methyl-4-chlorophenyl)guanidine hydriodide, M.P. 144–146° C.

*Example 21*

The process as described in Example 18 is repeated using as starting materials 14.0 parts of N-(3:4-dimethylphenyl)-S-methylisothiourea hydriodide (M.P. 142–144° C.), 2.18 parts of hydrazine hydrate and 112 parts of methanol. By working in a similar manner there is likewise obtained $N^1$-amino-$N^2$-(3:4-dimethylphenyl)guanidine hydriodide, M.P. 150–151° C.

*Example 22*

A mixture of 6.5 parts of N-(2:4:5-trimethylphenyl)-thiourea, 6.5 parts of methyliodide and 56 parts of methanol is heated under reflux for 3 hours. The solution is then evaporated to dryness under reduced pressure and the residue is dissolved in 40 parts of methanol and 1.5 parts of hydrazine hydrate are added. The solution is heated under reflux during 16 hours and the solvent is then removed by evaporation. The residue is dissolved in water, the solution is extracted with ether and the ethereal extract is discarded. The aqueous solution is then basified with dilute aqueous sodium hydroxide solution and the mixture is extracted with ether. The ethereal extract is washed with water, a little crushed ice is added and concentrated aqueous hydrochloric acid is then added dropwise until the mixture is faintly acid to Congo red. The mixture is evaporated to dryness under reduced pressure. The residue is dissolved in butanol and filtered and to the filtrate is added an equal volume of butanol saturated with dry hydrogen chloride. There is thus obtained $N^1$-amino-$N^2$-(2:4:5-trimethylphenyl)guanidine dihydrochloride which, after washing with butanol and then ether, has M.P. 148–150° C. with decomposition.

Example 23

2.55 parts of N-(2:4-dichloro-5-methylphenyl)thiourea (M.P. 172–174° C.) are heated under reflux with 1.7 parts of methyl iodide in 24 parts of methanol for 3 hours. The mixture is evaporated to dryness and the residue is dissolved in 24 parts of methanol and 0.5 part of hydrazine hydrate is added. The mixture is heated under reflux for 21 hours and is then evaporated to dryness under reduced pressure. The residue is crystallized from alcohol and there is thus obtained $N^1$-amino-$N^2$-(2:4-dichloro-5-methylphenyl)guanidine hydriodide, M.P. 241–243° C. with decomposition.

Example 24

19 parts of $N^1$-p-chlorophenyl-$N^1$-$N^2$:S-trimethylisothiourea (a gum) in 150 parts of methanol and heated under reflux with 5.7 parts of hydrazine monohydrochloride for 24 hours. The solution is evaporated to half volume and ether is added until no further precipitation takes place. The solid is collected, dissolved in water and the solution is basified with aqueous sodium hydroxide solution and the mixture is extracted with ether. The ethereal extract is washed with water and then a small amount of crushed ice is added and the mixture is adjusted to pH 5–6 by the dropwise addition of concentrated aqueous hydrochloric acid. The mixture is evaporated to dryness in vacuo and the residue is crystallized from butanol to give $N^1$-amino-$N^2$-p-chlorophenyl-$N^2$:$N^3$-dimethylguanidine hydrochloride, M.P. 200–202° C.

The $N^1$-p-chlorophenyl-$N^1$:$N^2$:S-trimethylisothiourea used as starting material may be obtained by adding 14.6 parts of methylisothiocyanate to a solution of 28.2 parts of N-methyl-p-chloroaniline in 160 parts of ethanol. The solution is kept for 48 hours at 25° C. and it is then evaporated to dryness when there is obtained $N^1$-p-chlorophenyl-$N^1$:$N^2$-dimethylthiourea, M.P. 98–100° C. A mixture of 21.45 parts of this thiourea, 160 parts of methanol and 14.5 parts of methyliodide is heated under reflux for 5 hours. The solvent is then evaporated in vacuo and the residue is treated with dilute aqueous sodium hydroxide solution and extracted with ether. The ethereal extract is then dried and evaporated to dryness to give $N^1$-p-chlorophenyl-$N^1$:$N^2$-S-trimethylisothiourea as a gum.

Example 25

A mixture of 6.85 parts of $N^1$-p-chlorophenyl-$N^2$:S-dimethylisothiourea hydriodide (M.P. 159–163° C.) and 1 part of hydrazine hydrate in 48 parts of methanol is heated under reflux for 24 hours. The solution is cooled and diluted with ether. There is thus obtained $N^1$-amino-$N^2$-p-chlorophenyl-$N^3$-methylguanidine hydriodide, M.P. 136–138° C.

Example 26

12.9 parts of $N^1$-phenyl-$N^2$:$N^2$:S-trimethylisothiourea hydriodide (M.P. 136–138° C.) in 80 parts of methanol are heated under reflux with 3.3 parts of a 60% w./v. solution of hydrazine hydrate in water for 22 hours. The solution is evaporated to dryness under reduced pressure and the residue is crystallized from butanol to give $N^1$-amino-$N^2$:$N^2$-dimethyl-$N^3$-phenylguanidine hydriodide, M.P. 134–137° C.

Example 27

A mixture of 3 parts of hydrazine hydrate, 15 parts of N-5-chloro-2-methoxyphenyl-S-methylisothiourea hydriodide, (M.P. 174–176° C.) and 50 parts of methanol, is heated under reflux for 15 hours. The mixture is evaporated to dryness and the residue is crystallized from a mixture of butanol and petroleum ether (B.P. 60–80° C.) to give $N^1$-amino-$N^2$-(5-chloro-2-methoxyphenyl)-guanidine hydriodide, M.P. 173–174° C.

Example 28

2.3 parts of hydrazine hydrate are added to a suspension of 15 parts of N-4-diphenylyl-S-methylisothiourea hydriodide (M.P. 218–220° C.) in 30 parts of methanol and the mixture is heated under reflux for 15 hours and then evaporated to dryness. The residue is crystallized from a mixture of butanol and petroleum ether (B.P. 60–80° C.) to give $N^1$-amino-$N^2$-4-diphenylylguanidine hydriodide, M.P. 148–149° C.

Example 29

3.5 parts of a 60% w./v. solution of hydrazine hydrate in water are added to a suspension of 11.9 parts of N-5-chloro-2-methylphenyl-S-methylisothiourea hydriodide (a gum from 2-methyl-5-chlorophenylthiourea, M.P. 155–158° C.) in 25 parts of ethanol, and the mixture is heated under reflux for 8 hours and then evaporated to dryness. The residue is crystallized from ethanol to give $N^1$-amino-$N^2$-(5-chloro-2-methylphenyl)guanidine hydriodide, M.P. 220–222° C.

Example 30

3.5 parts of a 60% w./v. solution of hydrazine hydrate in water are added to a suspension of 12.2 parts of S-methyl-N-p-hydroxyphenylisothiourea hydriodide, M.P. 177–179° C. in 25 parts of methanol and the mixture is heated under reflux for 24 hours and then evaporated to dryness. The residue is crystallized from a mixture of butanol and petroleum ether (B.P. 60–80° C.) to give $N^1$-amino-$N^2$-p-hydroxyphenylguanidine hyriodide, M.P. 144–146° C.

Example 31

3.8 parts of a 60% w./v. solution of hydrazine hydrate in water are added to a suspension of 14 parts of S-methyl-N-m-tolylisothiourea hyriodide (M.P. 150–151° C.) in 100 parts of methanol and the mixture is heated under reflux for 24 hours and then evaporated to dryness. The residue is dissolved in water, and the solution is basified with aqueous sodium hydroxide solution and extracted with ether. The ethereal extract is dried over sodium sulphate and then saturated with hydrogen chloride. The mixture is filtered and the solid residue is crystallized from butanol saturated with hydrogen chloride to give $N^1$-amino-$N^2$-m-tolylguanidine dihydrochloride, M.P. 170–175° C.

Example 32

10.3 parts of N-3:4-dichlorophenyl-S-methylisothiourea hydriodide (M.P. 170–172° C. from 3:4-dichlorophenylthiourea, M.P. 208–210° C.) are added to a solution of 2 parts of hydrazine hydrate in 15 parts of methanol. The mixture is heated under reflux for 15 hours and is then evaporated to dryness. The residue is dissolved in hot butanol saturated with hydrogen chloride and petroleum ether (B.P. 60–80° C.) is added until the solution becomes turbid. It is then cooled and filtered and there is thus obtained $N^1$-amino-$N^2$-(3:4-dichlorophenyl)-guanidine dihydrochloride, M.P. 172–174° C.

Example 33

A mixture of 7.5 parts of p-chlorophenylcyanamide and 3.0 parts of N:N-dimethylhydrazine is heated at 90–100° C. for 45 minutes. The reaction mixture is extracted repeatedly with hot dilute aqueous acetic acid. The combined acetic acid extracts are cooled and filtered and the filtrate is basified with dilute aqueous sodium hydroxide with ice cooling. The mixture is filtered and the solid residue is crystallized from benzene to give $N^1$-dimethylamino-$N^2$-(p - chlorophenyl)guanidine, M.P. 161–163° C.

Example 34

5 parts of p-chlorophenyl-N-methylcyanamide are added to a solution of 2.8 parts of hydrazine mono-hydrochloride in 30 parts of methanol, and the mixture is heated at 150° C. for 10 hours. The solution is evaporated to dryness and the residue is crystallized from ethanol to give $N^1$-amino-$N^2$-p-chlorophenyl-$N^2$-methylguanidine, M.P. 230–232° C.

Example 35

8.4 parts of 19% w./v. solution of sodium methoxide in methanol are added to a solution of 4.36 parts of N:$N^1$-dimethylhydrazine dihydrochloride in methanol. The suspension is filtered and the filtrate is evaporated to dryness. The residue is dissolved in 20 parts of butanol, 5 parts of p-chlorophenylcyanamide are added and the mixture is then heated under reflux for 14 hours. The solution is evaporated under reduced pressure and the residue is crystallized from a mixture of butanol saturated with hydrogen chloride and petroleum ether (B.P. 60–80° C.) to give $N^1$-methylamino-$N^1$-methyl-$N^2$-p-chlorophenylguanidine dihydrochloride. A solution of this compound in cold water is basified with dilute aqueous sodium hydroxide and the mixture is filtered. The solid residue is crystallized from petroleum ether (B.P. 60–80° C.) to give $N^1$-methylamino-$N^1$-methyl-$N^2$-p-chlorophenylguanidine, M.P. 94–96° C.

Example 36

To a solution of p-chlorophenylmethyl carbodiimide in acetone are added 1.8 parts of $N^1$:$N^1$:$N^2$-trimethylhydrazine and the mixture is kept at 20–25° C. for 16 hours. The solvent is removed by evaporation and the residue is boiled with dilute aqueous hydrochloric acid and then cooled and filtered. The filtrate is neutralized with sodium carbonate and the mixture is filtered. The filtrate is then strongly basified with aqueous sodium hydroxide and the mixture is extracted with ether. The ethereal extract is dried over potassium carbonate and an ethereal solution of hydrogen chloride is then added gradually until the ethereal extract is no longer alkaline. The mixture is filtered and the solid residue is dissolved in water and the solution is basified with sodium hydroxide and extracted with cyclohexane. After drying over potassium carbonate, the cyclohexane extract is evaporated in vacuo. The gummy residue is dried at 30–40° C. at 0.5 mm. pressure for 1 hour and there is thus obtained $N^1$ - dimethylamino - $N^2$ - p - chlorophenyl-$N^1$:$N^3$-dimethylguanidine.

The acetone solution of p-chlorophenylmethyl carbodiimide used as starting material may be obtained by heating 80 parts of acetone and 0.1 part of sulphur under reflux for 30 minutes. 8 parts of mercuric oxide and 5 parts of $N^1$-p-chlorophenyl-$N^2$-methylthiourea are then added and the mixture is heated under reflux with efficient stirring for 10 minutes. The mixture is cooled and filtered and the filtrate is suitable for use as starting material in the process described above.

Example 37

$N^1$ - dimethylamino - $N^1$:S - dimethyl - $N^2$ - p - chlorophenylisothiourea hydriodide, prepared as described below, is treated with a solution of 2.9 parts of n-butylamine in 25 parts of ethanol. The mixture is heated under reflux for 48 hours and the solvent is then evaporated in vacuo and the residue is extracted with warm dilute aqueous acetic acid. The acid extract is basified with dilute aqueous sodium hydroxide solution and the mixture is extracted with ether. The ethereal extract is dried over potassium carbonate and is then evaporated to dryness. The residue is dried at 30–40° C. and 0.5 mm. pressure to give $N^1$-dimethylamino-$N^1$-methyl-$N^2$-n-butyl-$N^3$-p-chlorophenylguanidine as a gum.

The $N^1$-dimethylamino - $N^1$ - S - dimethyl-$N^2$-p-chlorophenylisothiourea hydriodide used as starting material may be obtained by heating under reflux a mixture of 4.25 parts of $N^1$-dimethylamino-$N^1$-methyl-$N^2$-p-chlorophenylthiourea, 24 parts of methanol, and 2.7 parts of methyliodide for 3 hours. The solution is then evaporated to dryness and the residue so obtained is used as the starting material.

The $N^1$-dimethylamino-$N^1$-methyl-$N^2$-p-chlorophenylthiourea used as an intermediate product may be obtained by the gradual addition of a solution of 2.2 parts of trimethylhydrazine in 16 parts of ethanol to a solution of 5.4 parts of p-chlorophenylisothiocyanate in 24 parts of ethanol. The solution is kept at 25° C. for 2 hours and is then evaporated to half volume. The solution is cooled and there is thus obtained $N^1$-dimethylamino-$N^1$-methyl-$N^2$-p-chlorophenylthiourea as a crystalline solid, M.P. 86–89° C.

Example 38

A solution of 4 parts of N'-dimethylamino-N''-phenyl-S-methylisothiourea hydriodide in 20 parts of ethanol is heated under reflux for 8 hours during which time a slow stream of ammonia is passed through the solution. The solution is then cooled and diluted with N/10 aqueous sodium hydroxide and the mixture is extracted with ether. The ethereal extract is dried over sodium sulphate and then evaporated and there is thus obtained $N^1$-dimethylamino-$N^2$-phenylguanidine, M.P. 148–150° C.

Example 39

A mixture of 3.09 parts of $N^1$-benzylideneamino-$N^2$-p-chlorophenylguanidine hydrochloride in 24 parts of methanol is hydrogenated at atmospheric pressure in the presence of platinum (prepared from 0.03 part of platinum oxide). When the theoretical volume of hydrogen has been absorbed, the reaction mixture is filtered and the filtrate is evaporated to dryness. The residue is dissolved in water, 10 parts of normal aqueous hydrochloric acid are added and the mixture is distilled, with the addition of more water as required, until there is no longer any odour of benzaldehyde in the distillate. The mixture is then evaporated to dryness in vacuo. The residual oil is stirred with ether containing hydrogen chloride and the mixture is filtered. The solid residue is dissolved in butanol and the butanol solution is washed several times with water. It is then dried over magnesium sulphate and evaporated to small bulk in vacuo. The residue is stirred with ethereal hydrogen chloride solution until it crystallizes. There is thus obtained $N^1$-benzylamino-$N^2$-p-chlorophenylguanidine dihydrochloride, M.P. 125–135° C.

Example 40

A solution of 5.2 parts of $N^1$-isopropylideneamino-$N^2$-p-chlorophenylguanidine hydrochloride in 40 parts of methanol is hydrogenated over platinum (prepared from 0.05 part of platinum oxide) at atmospheric pressure. When the actual volume of hydrogen is absorbed, the reaction mixture is filtered and the filtrate is evaporated to dryness. There is thus obtained $N^2$-p-chlorophenyl-$N^1$-isopropylaminoguanidine hydrochloride as a hygroscopic gum.

Example 41

A solution of 3.45 parts of $N^1$-nonylideneamino-$N^2$-p-chlorophenylguanidine hydrochloride in 24 parts of methanol is hydrogenated at atmospheric pressure over platinum (prepared from 0.03 part of platinum oxide). When the theoretical volume of hydrogen is absorbed the reaction mixture is filtered. The filtrate is treated with an ethereal solution of hydrogen chloride followed by dilution with ether and there is thus obtained $N^1$-nonylamino-$N^2$-p-chlorophenylguanidine dihydrochloride, M.P. 145–150° C. with decomposition.

What I claim is:

A guanidine compound selected from the group consisting of: $N^1$-amino-$N^2$-2:4-dichlorophenylguanidine, $N^1$-amino-$N^2$-5:6:7:8-tetrahydro-$\beta$-naphthylguanidine and $N^1$-amino-$N^2$-p-chlorophenylguanidine.

References Cited in the file of this patent

UNITED STATES PATENTS

| | | |
|---|---|---|
| 2,455,897 | Nagy | Dec. 7, 1948 |
| 2,479,498 | Lecher | Aug. 16, 1949 |

OTHER REFERENCES

Kirsten and Smith: J. Am. Chem. Soc., 58, 800 (1936).

Finnegan et al.: Journal of Organic Chemistry, vol. 18, pages 779–91 (1953), page 786 relied on.

Scott et al.: Journal of the American Chemical Society, vol. 75, pages 4053–4 (1953).

Schwartzman et al.: Journal of the American Chemical Society, vol. 76, pages 781–5 (1954), page 782 relied on.